United States Patent
Choi et al.

(10) Patent No.: US 7,966,434 B2
(45) Date of Patent: Jun. 21, 2011

(54) DETAILED DESCRIPTION OF THE PREFERRED EMBODIMENTS

(75) Inventors: Hae Yong Choi, Seongnam (KR); Young Kyoo Cho, Suwon (KR)

(73) Assignee: Bixolon Co., Ltd., Suwon (KR)

( * ) Notice: Subject to any disclaimer, the term of this patent is extended or adjusted under 35 U.S.C. 154(b) by 210 days.

(21) Appl. No.: 12/496,168

(22) Filed: Jul. 1, 2009

(65) Prior Publication Data

US 2010/0011131 A1 Jan. 14, 2010

(30) Foreign Application Priority Data

Jul. 9, 2008 (KR) .................. 10-2008-0066580

(51) Int. Cl.
*G06F 3/12* (2006.01)

(52) U.S. Cl. .................. 710/40; 710/5; 710/33
(58) Field of Classification Search .............. None
See application file for complete search history.

(56) References Cited

U.S. PATENT DOCUMENTS

| | | | | |
|---|---|---|---|---|
| 5,038,320 | A * | 8/1991 | Heath et al. | 710/10 |
| 5,491,804 | A * | 2/1996 | Heath et al. | 710/7 |
| 5,594,653 | A | 1/1997 | Akiyama et al. | |
| 5,594,920 | A * | 1/1997 | Ebina et al. | 705/24 |
| 5,794,214 | A * | 8/1998 | Ebina et al. | 705/24 |
| 5,862,355 | A * | 1/1999 | Logsdon | 710/116 |
| 6,240,530 | B1 * | 5/2001 | Togawa | 714/38.13 |
| 6,615,291 | B1 * | 9/2003 | Kamei et al. | 710/22 |
| 7,593,399 | B2 * | 9/2009 | Nishihara | 370/389 |

FOREIGN PATENT DOCUMENTS

| | | |
|---|---|---|
| JP | 2000085211 A | 8/2000 |
| KR | 1020000033703 A | 6/2000 |

* cited by examiner

*Primary Examiner* — Cheng-Yuan Tseng
(74) *Attorney, Agent, or Firm* — The Webb Law Firm

(57) ABSTRACT

Disclosed is a printing apparatus including a priority identifier establishment unit. More particularly, the printing apparatus, processing an instruction designated by a priority identifier before another instruction, includes the priority identifier establishment unit that allows a priority identifier to be designated in various forms and methods. Since the priority identifier can be established in various forms and methods, the printing apparatus can achieve enhanced flexibility and effect in priority processing.

12 Claims, 4 Drawing Sheets

DETAILED DESCRIPTION OF THE PREFERRED EMBODIMENTS

CROSS-REFERENCE TO RELATED APPLICATIONS

This application claims the priority of Korean Patent Application No. 2008-0066580 filed on Jul. 9, 2008, in the Korean Intellectual Property Office, the disclosure of which is incorporated herein by reference.

BACKGROUND OF THE INVENTION

1. Field of the Invention

The present invention relates to a printing apparatus for establishing a priority identifier and a method of establishing a priority identifier, and more particularly, to a printing apparatus capable of establishing a priority identifier in various forms and methods to process an instruction, designated by the priority identifier, before another instruction.

2. Description of the Related Art

In general, printing apparatuses are connected to personal computers to print out documents or pictures. Also, printing apparatuses may be provided in data processing apparatuses such as point-of-sale (POS) terminals or electronic cash registers used for monetary transactions, to print out receipts and the like. Those printing apparatuses perform operations, including printing, in response to print data and instructions sent from host computers including personal computers.

For example, FIG. 1 is a block diagram illustrating the basic hardware configuration of a printing apparatus. The printing apparatus includes an interface unit 1 receiving data from a host computer or sending data to the host computer, a memory unit 2 storing various pieces of data, a print driving unit 4 controlling the driving of mechanical components within the printing apparatus, for example, a print part 6, a motor part 7 and flange parts 8, a sensor unit 5 detecting the status of the printing apparatus, and a central processing unit (CPU) 3 controlling the operation of the print driving unit 4 by checking data or instructions sent from the host computer via the interface unit 1 and checking the status of the printing apparatus based on the output signal of the sensor unit 5.

Printing apparatuses at an early stage of development interpreted and processed control instructions in First-In, First-out (FIFO) order. However, when an error occurs during the use of a printing apparatus, such as when paper supply is depleted or a printer cover is opened, or as an occasion arises, an instruction delivered later may need to be processed before an instruction delivered earlier. In response to this need, U.S. Pat. No. 5,594,653 discloses a printing apparatus that divides commands into instructions to be processed in real-time (hereinafter, referred to as 'real-time instructions') and instructions to be processed in FIFO order (hereinafter, referred to as 'general instructions') and enables the real-time instruction to be processed preferentially (i.e., first) over general instructions.

However, if a command itself is determined to be a real-time instruction or a general instruction, every necessary real-time command needs to be established in advance by anticipating every possible circumstance that may occur in the printing apparatus at the time of command implementation. In this regard, a printing apparatus has been proposed that establishes an identifier for designating priority processing (hereinafter, referred to as 'priority identifier') in advance, and enables an instruction designated by the priority identifier to be processed preferentially over other instructions. However, this method may also be disadvantageous, in that the previously established prior-processing identifier restricts command implementation.

SUMMARY OF THE INVENTION

An aspect of the present invention provides a printing apparatus including a priority identifier establishment unit that can establish priority identifiers in various forms and methods in order to process an instruction, designated by a priority identifier, preferentially (i.e., first) over other instructions.

According to an aspect of the present invention, there is provided a printing apparatus operating according to data sent from a host computer, the printing apparatus including: a data reception unit receiving data sent from the host computer; a data processing unit detecting an establish instruction for establishing a priority identifier designating data, which is to be processed preferentially, in the printing apparatus by analyzing the data received in the data reception unit, and reading a priority identifier instructed by the establish instruction; and a memory storing the read priority identifier.

The establish instruction may be set in the printing apparatus in advance.

The priority identifier may include an identification value indicating a priority processing instruction, and information indicating a length of data of priority processing. Alternatively, the priority identifier may include an identification value for processing at least one successive command preferentially. Alternatively, the priority identifier may include an identification value indicating a start of priority processing and an identification value indicating an end of priority processing.

According to another aspect of the present invention, there is provided a method of establishing a priority identifier in a printing apparatus operating according to data sent from a host computer, the method including: receiving data sent from the host computer; detecting an establish command for establishing a priority identifier designating data, which is to be processed preferentially, in the printing apparatus by analyzing the received data; reading a priority identifier indicated by the establish command; and storing the read priority identifier.

According to another aspect of the present invention, there is provided a printing apparatus performing a printing operation according to data sent from a host computer, the printing apparatus including: a data reception unit receiving data output from the host computer; a priority identifier establishment unit performing establishment such that information about a priority identifier be transferable, the priority identifier designating data to be processed preferentially among the data received in the data reception unit; and a processing unit checking whether the data received in the data reception unit includes a priority identifier established by the priority identifier establishment unit, and performing priority processing on the data designated by the priority identifier.

The priority identifier establishment unit may receive an establish instruction for establishing a priority identifier designating data, which is to be processed preferentially, from the host computer, and perform establishment to transfer the information about the priority identifier.

The priority identifier establishment unit may include a non-volatile memory, or a dual in-line package (DIP) switch.

The priority identifier may include an identification value indicating a priority-processing instruction, and information indicating a length of data requiring priority processing. Alternatively, the priority identifier may include an identification value for processing at least one successive command preferentially. Alternatively, the priority identifier may include an identification value indicating a start of priority processing and an identification value indicating an end of priority processing.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. Detailed descriptions related to well-known functions or configurations will be ruled out in order not to unnecessarily obscure subject matters of the present invention.

Figure 2:
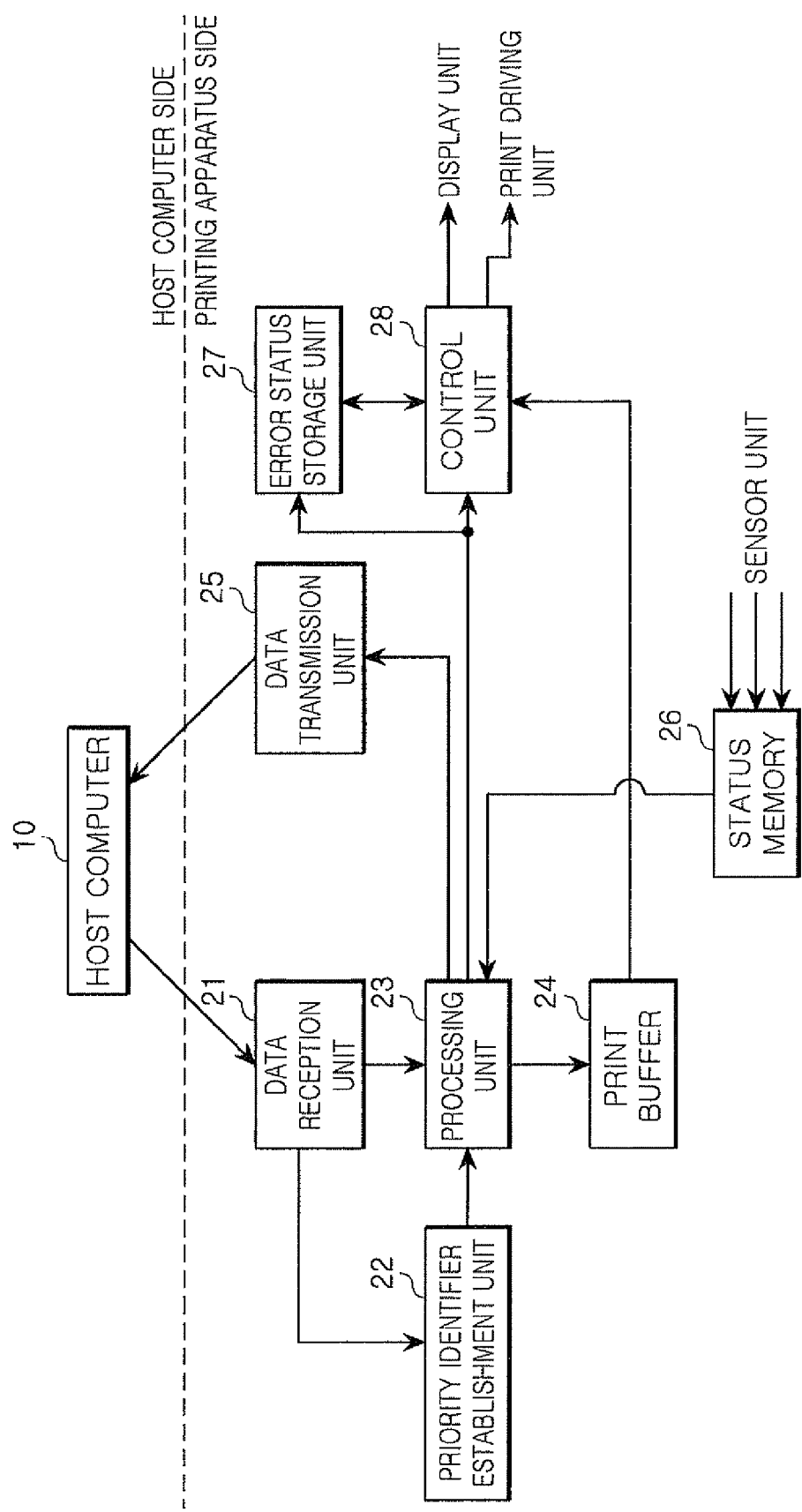
FIG. 2 illustrates the configuration of a printing apparatus capable of establishing a priority identifier, according to an exemplary embodiment of the present invention.

FIG. 2 is a functional block diagram of a printing apparatus according to an exemplary embodiment of the present invention. The printing apparatus includes: a data reception unit 21 receiving data sent from a host computer 10; a data transmission unit 25 sending data to the host computer 10; a priority identifier establishment unit 22 establishing a priority identifier, which designates data to be processed preferentially (i.e., first) over other data, by analyzing data received in the data reception unit 21, and storing the established priority identifier; a processing unit 23 interpreting and processing an instruction, designated by the priority identifier, preferentially over another general instruction that has not been designated by the priority identifier, among the data received in the data reception unit 21; a print buffer 24 storing reception data classified as print data by the processing unit 23; a control unit 28 controlling the operation of the printing apparatus according to an instruction delivered from the processing unit 23 or performing control to read and print out the data stored in the print buffer 24; and a status memory 26 storing information about the status of the printing apparatus.

Figure 1:
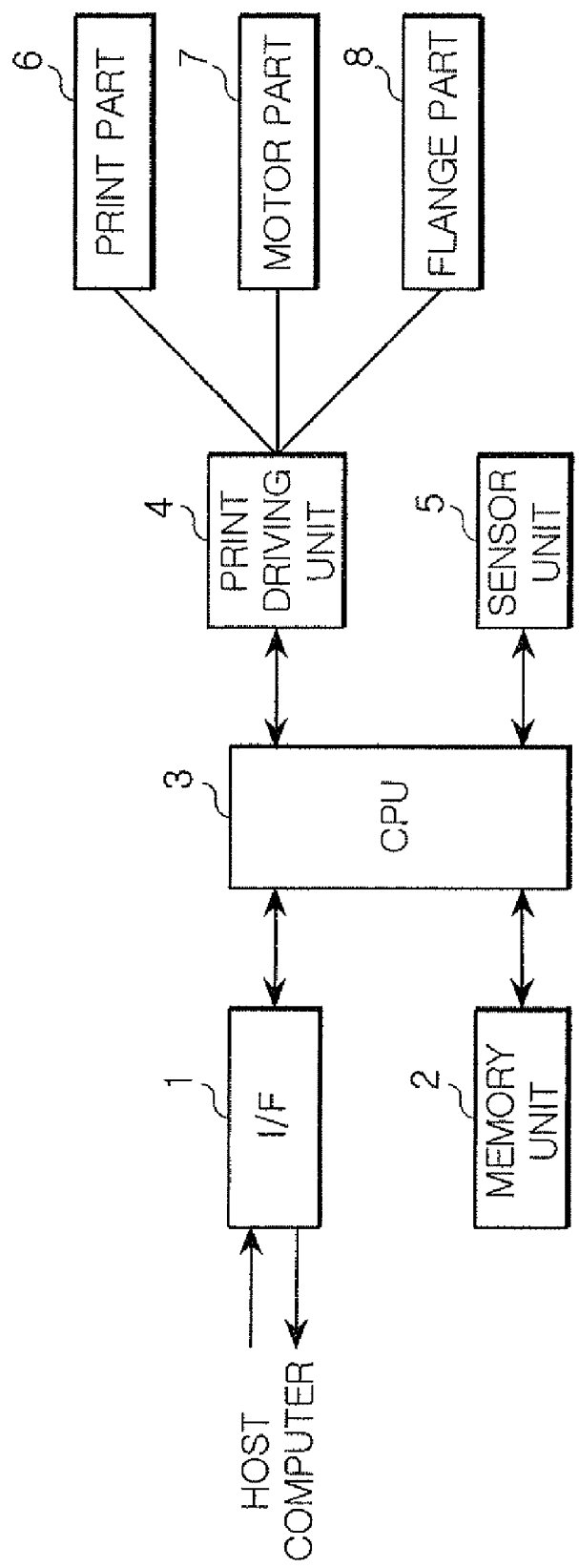
FIG. 1 is a block diagram illustrating the basic hardware configuration of a printing apparatus.

In addition to the above configuration, the printing apparatus, as in the related art printing apparatus depicted in FIG. 1, may additionally include a plurality of sensors detecting the status of the printing apparatus, a print mechanism unit (not shown), and an error status storage unit 27. Also, the printing apparatus may further include other existing known components for printing apparatuses. The functions of those components are identical to those in the existing apparatus.

Basically, the printing apparatus processes data received from the host computer 10 in FIFO order. However, in the event that there is data or an instruction that needs to be processed before another data or instruction, the printing apparatus processes this data or instruction preferentially over others. To this end, the host computer 10 sends the printing apparatus a priority identifier as well as data that requires priority processing.

The priority identifier is not a command that is performed directly in association with the operation of the printing apparatus, but is merely identification information that indicates that the accompanying print and instruction data has priority in processing, namely, that it needs to be processed preferentially.

The priority identifier is not established in advance but may be established in various forms and methods by the priority identifier establishment unit 22 as an occasion arises.

In detail, the priority identifier establishment unit 22 may include a data processor (not shown) and a memory (not shown). The data processor detects an establish instruction for establishing a priority identifier designating data, which is to be preferentially processed, by analyzing data sent from the host computer 10, and reads a priority identifier instructed by the establish instruction. The memory stores the read priority identifier.

Hereinafter, the establishment of the priority identifier in the priority identifier establishment unit 22 will be described in detail.

The priority identifier establishment unit 22 may receive information for identifier designation from the host computer 10 and may establish an identifier according to the received information. Information received from the host computer 10 contains a predetermined identifier establish command for the establishment of an identifier.

Embodiment 1

The host computer 10 may send a priority identifier which is to be used in combination with an identifier establish command. The priority identifier contains an identification value indicating a priority-processing instruction, and information indicating the length of data which is to be processed preferentially.

For example, if an identifier establish command is set to [FF] in advance and the host computer 10 sends '[FF] [ACK] ' <2>' to the printing apparatus, the priority identifier establishment unit 22 detects [FF], an establish command. When the establish command is detected, [ACK] <2>, which is a priority identifier designated by the detected establish command [FF], is read and stored in the memory. The priority identifier, [ACK] <2>, allows two commands following [ACK] to be interpreted and processed before another instruction when [ACK] is detected from the received data.

Thus, when data received from the host computer 10 contains [ACK], the processing unit 23 interprets, processes and executes two commands following [ACK] preferentially over another instruction. In detail, if the processing unit 23 receives '[ACK][ESC]!<n>[ETO]<n>ABCDFG [LF]', the processing unit 23 processes '[ESC]!<n>' and '[EOT]<n>', two commands following '[ACK] assigned as a priority identifier, before other general instructions.

Embodiment 2

The host computer 10 may send a priority identifier which is to be used in combination with an identifier establish command. The priority identifier contains an identification value for the priority processing of only one successively received command.

For example, if an identifier establish command is set to [FF] in advance and the host computer 10 sends '[FF][ACK]' to the printing apparatus, the priority identifier establishment unit 22 designates '[ACK]' as a priority identifier.

Thereafter, the processing unit 23 interprets, processes and executes only one command following '[ACK]' before another instruction. In detail, if the processing unit 23 receives '[ACK][ESC]!<n>[EOT]<n>ABCDFG [LF]', the processing unit 23 processes one command following '[ACK]' designated as a priority identifier, that is, '[ESC]!<n>' preferentially over another general instruction.

Embodiment 3

The host computer 10 may send an identification value indicating the start of priority processing and an identification value indicating the end of the priority processing, which are to be used in combination with an identifier establish command.

For example, if an identifier establish command is set to [FF] in advance and the host computer 10 sends '[FF][ACK][NAK]' to the printing apparatus, the priority identifier establishment unit 22 sets a priority-processing start identification value and a priority-processing end identification value to '[ACK]' and '[NAK]', respectively.

Thereafter, the processing unit 23, when receiving '[ACK]', interprets, processes and executes at least one command received between '[ACK]' and '[NAK]' preferentially over another instruction. In detail, when receiving '[ACK][ESC]!<n>[EOT]<n>[NAK] 0123456 [LF]', the processing unit 23 processes '[ESC]!<n>[EOT] <n>', an instruction received between '[ACK]' and '[NAK]', before another general instruction.

Using an establish command has so far been described as a method for the host computer to establish a priority identifier in the printing apparatus. Hereinafter, other methods will be described.

As for another method, the priority identifier establishment unit 22 reads information for identifier establishment from a non-volatile memory, and establishes a priority identifier according to the read information. In detail, information for identifier designation is stored on a specific address in the non-volatile memory in advance. When the designation of a priority identifier is necessary, the priority identifier establishment unit 22 may read the information for identifier establishment from the specific address in the non-volatile memory, and establish an identifier according to the read information. The information for the establishment of a priority identifier stored on the specific address in the non-volatile memory may have any one format among "an identification value indicating a priority-processing instruction and information indicating the length of data of priority processing", "an identification value for allowing the priority processing of one or more successively received commands", and "an identification value indicating the start of priority processing and an identification value indicating the end of priority processing".

As for another method, the priority identifier establishment unit 22 may establish an identifier by the use of at least one dual in-line package (DIP) switch.

For example, in the case of using five DIP switches, each of the DIP switches may be matched to a specific identifier as follows:

| DIP #1 (ACK) | DIP #2 (XON) | DIP #3 (XOFF) | DIP #4 | DIP #5 |
| --- | --- | --- | --- | --- |

If all the five DIP switches are OFF, a priority identifier is not established. If DIP #1 is ON, [ACK] is designated as a priority identifier, and if DIP 42 is ON, [XON] is designated as a priority identifier.

In the case of using five DIP switches, DIP #1 may be used to determine whether or not to execute priority processing, and DIP #2, 3, 4 and 5 may be used to set the number of priority-processing commands.

For example, if DIP #1 is OFF, priority processing is not executed, and if DIP #1 is ON, priority processing is executed. The number of commands for the execution of priority processing may be determined as follows:

DIP #2: ON, #3: OFF, #4: OFF, #5: OFF: the number of priority processing instruction: 1
DIP #2: OFF, #3: ON, #4: OFF, #5: OFF: the number of priority processing instruction: 2
DIP #2: ON, #3: ON, #4: OFF, #5: OFF: the number of priority processing instruction: 3
DIP #2: OFF, #3: OFF, #4: ON, #5: OFF: the number of priority processing instruction: 4

Figure 3:
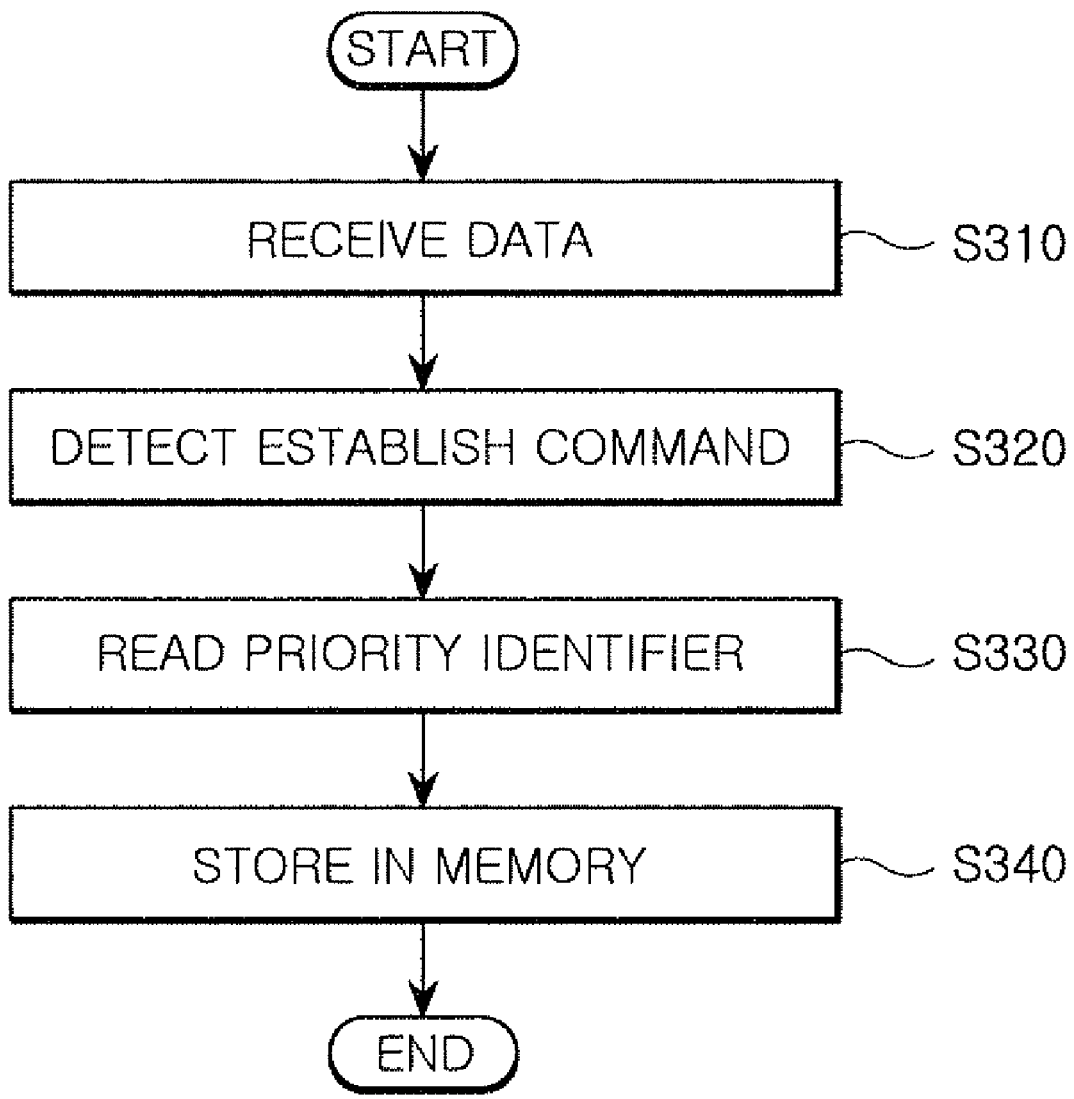
FIG. 3 is a flowchart showing a method of establishing a priority identifier, according to an exemplary embodiment of the present invention.

FIG. 3 is a flowchart of a method of establishing a priority identifier according to an exemplary embodiment of the present invention.

The method of establishing a priority identifier according to an exemplary embodiment of the present invention, includes: receiving data sent from a host computer in operation S310; detecting an establish command for establishing, in the printing apparatus, a priority identifier designating data which is to be processed preferentially by analyzing the received data in operation S320; reading a priority identifier instructed by the establish command in operation 3330; and storing the read priority identifier in operation S340.

Figure 4:
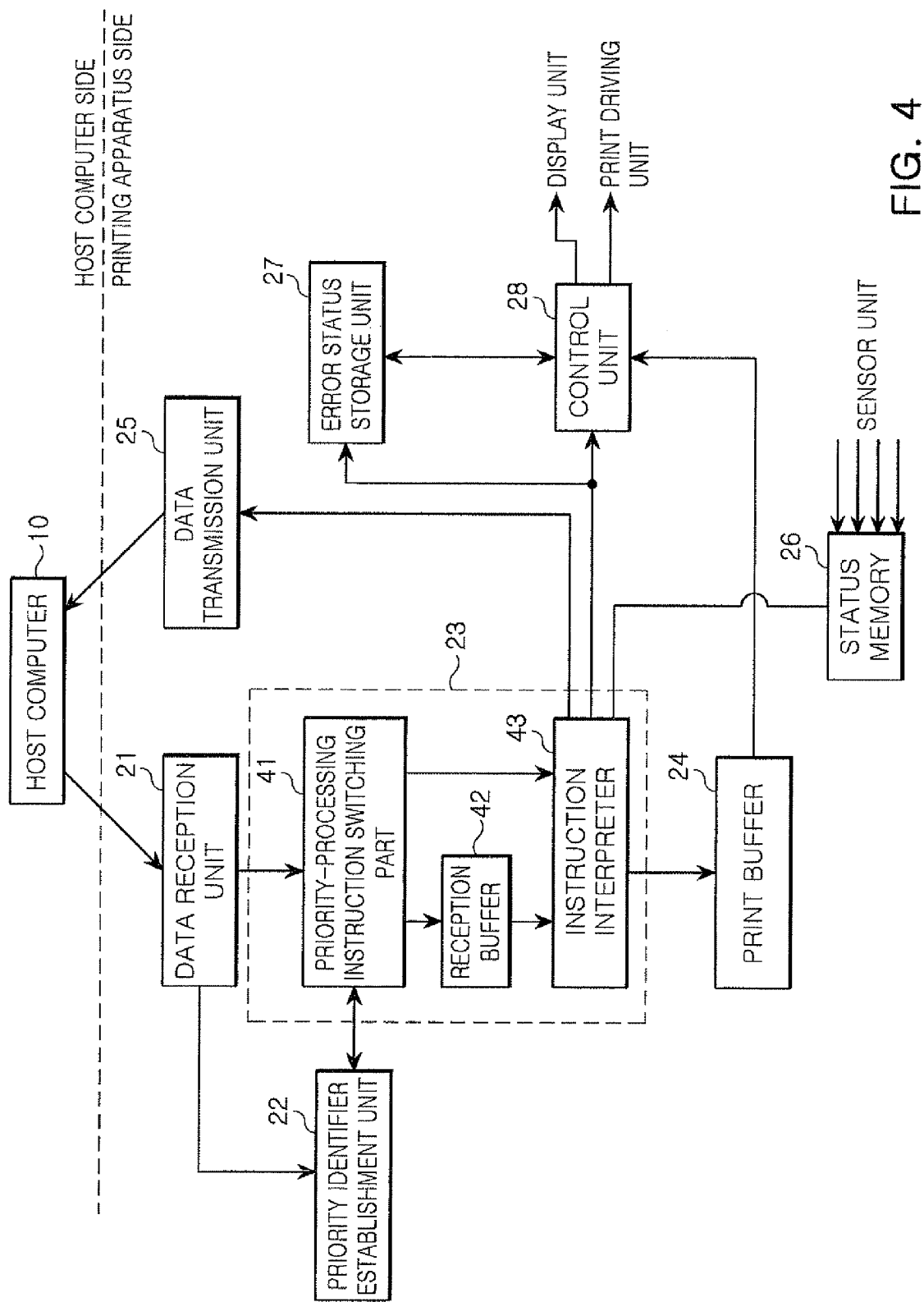
FIG. 4 illustrates a printing apparatus capable of establishing a priority identifier, according to another exemplary embodiment of the present invention.

FIG. 4 illustrates the configuration of a printing apparatus that processes data sent from a host computer by using a priority identifier according to the present invention.

As shown in FIG. 4, the printing apparatus, which processes data sent from the host computer by using a priority identifier according to the present invention, and detects whether or not the sent data contains an establish command for establishing a priority identifier, thereby establishing a priority identifier in advance.

The priority identifier is established by the priority identifier establishment unit 22. In detail, a data reception unit 21 receives data sent from the host computer 10. The priority identifier establishment unit 22 detects an establish command for establishing a priority identifier designating data, which is to be processed preferentially, in the printing apparatus by analyzing the received data, reads a priority identifier instructed by the establish instruction, and stores the read priority identifier, thereby establishing the priority identifier. Also, the priority identifier establishment unit 22 may transfer an existing priority identifier to a newly transmitted priority identifier.

Hereinafter, the process of processing data in the printing apparatus after the priority identifier establishment unit 22 establishes the priority identifier will be described in terms of functions of each component.

First, the host computer 10 checks whether print data and instruction data to be sent to the printing apparatus require priority processing. If there is a need for priority processing, the host computer 10 generates a priority identifier, which has already been established in the printing apparatus, and sends the priority identifier together with the print data and the instruction data to the printing apparatus. The printing apparatus, when receiving the data from the host computer 10, checks whether to perform priority processing, using a preset priority identifier. If the data contains a priority identifier, the printing apparatus performs the priority processing on data designated by the priority identifier. If the priority identifier is absent in the data, the received data are processed in FIFO order.

The printing apparatus includes the data reception unit 21, the data transmission unit 25, the priority identifier establishment unit 22, a priority processing instruction switching part 41, a reception buffer 42, an instruction interpreter 43, the print buffer 24, the error-status storage unit 27, the control unit 28 and the status memory 26.

In detail, the data reception unit 21 receives data sent from the host computer 10, and the data transmission unit 25 sends data to the host computer 10. If the received data contains a priority identifier pre-established by the priority identifier establishment unit 22, the priority-processing instruction switching part 41 sends received data designated S by the priority identifier directly to the instruction interpreter 43, and the remaining received data is output to the reception buffer 42. The reception buffer 42 stores therein received data which is not designated by the priority identifier, and outputs the data in FIFO order. The instruction interpreter 43 interprets received data output from the priority-processing instruction switching part 41 as having the highest priority in processing, and received data output from the reception buffer 42 as having the next highest priority in processing, thereby distinguishing the instruction data from the print data and outputting the distinguished data. If the interpreted instruction is a status send instruction, the status information of the status memory 26 is sent to the host computer 10 via the data transmission unit 25. The print buffer 24 stores received data classified as the print data by the instruction interpreter 43, and the control unit 28 controls the operation of the printing apparatus according to the instruction data sent from the instruction interpreter 43, or performs control to print out the data stored in the print buffer 24. Also, the status memory 26 stores the status information of the printing apparatus.

The priority-processing instruction switching part 41, the reception buffer 42 and the instruction interpreter 43 are mere examples of the processing unit of FIG. 2, and various methods may be applied, provided that they allow for the priority processing of data using a priority identifier.

As in an existing printing apparatus, the printing apparatus according to this exemplary embodiment of the present invention may further include a plurality of sensors detecting the status of the printing apparatus, print mechanism functions (not shown), and the error status storage unit 27. In addition, the printing apparatus according to this exemplary embodiment of the present invention may further include general components used in known printing apparatuses, and the functions of those components are identical to those of existing like components.

As set forth above, according to exemplary embodiments of the invention, a priority identifier can be established in various forms and methods in a printing apparatus capable of processing an instruction designated by a priority identifier preferentially over other instructions, so that the printing apparatus can cope properly with diverse situations that may be caused due to the environment of use.

While the present invention has been shown and described in connection with the exemplary embodiments, it will be apparent to those skilled in the art that modifications and variations can be made without departing from the spirit and scope of the invention as defined by the appended claims.

What is claimed is:

1. A printing apparatus operating according to data sent from a host computer, the printing apparatus comprising:
 an establish command being set within the printing apparatus in advance;
 a data reception unit receiving the data sent from the host computer;
 a priority identifier establishment unit detecting the establish command thereto establishing a priority identifier which designates the data to be processed preferentially, in the printing apparatus by analyzing the data received in the data reception unit, and reading a priority identifier indicated by the establish command;
 a processing unit interpreting and processing an instruction, designated by the priority identifier, preferentially over another general instruction that has not been designated by the priority identifier, among the data received in the data reception unit; and
 a memory storing the priority identifier;
 wherein the priority identifier is identification information indicating accompanied print or instruction data has priority in the processing unit.

2. The printing apparatus of claim 1, wherein the priority identifier includes an identification value indicating a priority-processing instruction, and information indicating a length of data of priority processing.

3. The printing apparatus of claim 1, wherein the priority identifier includes an identification value for processing at least one successive command preferentially.

4. The printing apparatus of claim 1, wherein the priority identifier includes an identification value indicating a start of priority processing and an identification value indicating an end of priority processing.

5. A method of establishing a priority identifier in a printing apparatus operating according to data sent from a host computer, the method comprising:
 setting an establish command in the printing apparatus in advance;
 receiving, in a data reception unit, the data sent from the host computer;
 detecting, in a priority identifier establishment unit, the establish command for establishing a priority identifier designating data, which is to be processed preferentially, in the printing apparatus by analyzing the received data;
 reading a priority identifier indicated by the establish command;
 interpreting and processing an instruction, in a processing unit, designated by the priority identifier preferentially over another general instruction that has not been designated by the priority identifier among the data received in the data reception unit; and
 storing the priority identifier;
 wherein the priority identifier is identification information indicating accompanied print or instruction data has priority in said step of interpreting and processing.

6. A printing apparatus performing a printing operation according to data sent from a host computer, the printing apparatus comprising:
 an establish command being set within the printing apparatus in advance;
 a data reception unit receiving the data output from the host computer;
 a priority identifier establishment unit setting information about a priority identifier, the priority identifier designating data to be processed preferentially among the data received in the data reception unit, wherein the priority identifier establishment unit detects the establish command for establishing a priority identifier designating data, which is to be processed preferentially, in the printing apparatus by analyzing the received data; a processing unit checking whether the data received in the data reception unit includes a priority identifier established by the priority identifier establishment unit, and performing priority processing on the data designated by the priority identifier; and a memory storing the priority identifier;

wherein the priority identifier is identification information indicating accompanied print or instruction data has priority in the processing unit.

7. The printing apparatus of claim 6, wherein the priority identifier establishment unit receives an establish instruction for establishing a priority identifier designating data, which is to be processed preferentially, from the host computer, and performs establishment to transfer the information about the priority identifier.

8. The printing apparatus of claim 6, wherein the priority identifier establishment unit includes a non-volatile memory.

9. The printing apparatus of claim 6, wherein the priority identifier establishment unit includes a dual in-line package (DIP) switch.

10. The printing apparatus of claim 6, wherein the priority identifier includes an identification value indicating a priority-processing instruction, and information indicating a length of data requiring priority processing.

11. The printing apparatus of claim 6, wherein the priority identifier includes an identification value for processing at least one successive command preferentially.

12. The printing apparatus of claim 6, wherein the priority identifier includes an identification value indicating a start of priority processing and an identification value indicating an end of priority processing.

* * * * *

UNITED STATES PATENT AND TRADEMARK OFFICE
CERTIFICATE OF CORRECTION

| | | |
|---|---|---|
| PATENT NO. | : 7,966,434 B2 | Page 1 of 1 |
| APPLICATION NO. | : 12/496168 | |
| DATED | : June 21, 2011 | |
| INVENTOR(S) | : Choi et al. | |

It is certified that error appears in the above-identified patent and that said Letters Patent is hereby corrected as shown below:

Title Page, item (54);

<u>In the Title</u>: The title of this invention should read: "Printing Apparatus for Establishing Priority Identifier"

Signed and Sealed this
Eleventh Day of October, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,966,434 B2 | Page 1 of 1 |
| APPLICATION NO. | : 12/496168 | |
| DATED | : June 21, 2011 | |
| INVENTOR(S) | : Choi et al. | |

It is certified that error appears in the above-identified patent and that said Letters Patent is hereby corrected as shown below:

Title Page, Item (54) and at Column 1, lines 1 and 2,

<u>In the Title</u>: The title of this invention should read: "Printing Apparatus for Establishing Priority Identifier"

This certificate supersedes the Certificate of Correction issued October 11, 2011.

Signed and Sealed this
Eighth Day of November, 2011

David J. Kappos
*Director of the United States Patent and Trademark Office*